(12) United States Patent
Miller (10) Patent No.: US 10,312,676 B1
(45) Date of Patent: Jun. 4, 2019

(54) ELECTRICAL BOX ALIGNMENT SYSTEM

(71) Applicant: Lee Miller, Soldiers Grove, WI (US)

(72) Inventor: Lee Miller, Soldiers Grove, WI (US)

( * ) Notice: Subject to any disclaimer, the term of this patent is extended or adjusted under 35 U.S.C. 154(b) by 0 days.

(21) Appl. No.: 15/731,095

(22) Filed: Apr. 18, 2017

Related U.S. Application Data (63) Continuation of application No. 62/391,020, filed on Apr. 18, 2016.

(51) Int. Cl.
  *H02G 3/12* (2006.01)
  *H01H 9/02* (2006.01)

(52) U.S. Cl.
  CPC ............... *H02G 3/12* (2013.01); *H01H 9/02* (2013.01)

(58) Field of Classification Search
  CPC .................................. H02G 3/12; H01H 9/02
  USPC ......................................................... 174/520
  See application file for complete search history.

(56) References Cited

U.S. PATENT DOCUMENTS

| | | | | |
|---|---|---|---|---|
| 2,492,115 A * | 12/1949 | Crowther | ............... | F16B 21/16 174/66 |
| 3,689,864 A * | 9/1972 | Glader | .................... | H01R 4/64 174/51 |
| 3,728,468 A * | 4/1973 | Grauer | ................ | H01R 13/648 174/51 |
| 4,281,773 A * | 8/1981 | Mengeu | ................... | H02G 3/18 174/53 |
| 4,459,736 A * | 7/1984 | Judkins | .................. | H01R 24/76 439/569 |
| 4,909,692 A * | 3/1990 | Hendren | ................ | F16B 43/00 174/57 |
| 4,948,317 A * | 8/1990 | Marinaro | ................ | F16B 43/00 220/3.7 |
| 5,108,243 A * | 4/1992 | Antonucci | ............... | H02G 3/18 220/3.7 |
| 5,116,242 A * | 5/1992 | Scotti | ....................... | H02G 3/18 411/522 |
| 5,921,737 A * | 7/1999 | Ibey | ......................... | H02G 3/18 411/535 |
| 6,176,666 B1 * | 1/2001 | Osterlund | ................. | F16B 5/02 411/535 |
| 6,501,021 B1 * | 12/2002 | Greene | .................. | H02G 3/121 174/53 |
| 10,077,796 B2 * | 9/2018 | Antonucci | ............... | H02G 3/10 |
| 2016/0069381 A1 * | 3/2016 | Antonucci | ............... | H02G 3/10 411/547 |

* cited by examiner

*Primary Examiner* — Andargie M Aychillhum
*Assistant Examiner* — Michael F McAllister
(74) *Attorney, Agent, or Firm* — BRRLaw LLC; Bryan R. Rosiejka (57) ABSTRACT

The ability to wall mount switching and power outlets expeditiously and uniformly to walled surfaces may be professionally achieved through the use of wedged resilient spacing members positioned between the switching or outlet units and their mounts. The spacing members provide a perfected flush and even installation of the switching and power outlets to the abutting wall surface. The compressed resilient spacing members compensate for what normally would be flawed installations.

11 Claims, 5 Drawing Sheets

ELECTRICAL BOX ALIGNMENT SYSTEM

CROSS-REFERENCE TO RELATED APPLICATION

This application is a non-provisional application of provisional application 62/391,020 filed Apr. 18, 2016, the contents of which are incorporated herein and made a part of this application in their entirety.

FIELD OF INVENTION

The invention pertains to wall mounted electrical boxes and more particularly to wall mounted electrical box systems containing component parts to facilitate the wall mounting thereof.

BACKGROUND OF THE INVENTION

Terminal wall mounted electrical box assemblies for switches and power outlets which are customarily equipped with face plates are prone to misaligned wall mounting problems. Proper electrical box assembly mounting requires that the covering face plate rests flushly against the exterior surface of the abutting wall. Frequently too much or too little of the wall box cut-out space is left exposed after the installation which makes it particularly difficult to flushly match the wall box and the wall cut-out section surface with the electrical box covering face plate. Frequently the cut-out wall section or wall mount positioning of the box is so misaligned that it is impossible to mount the face plate flushly against the exterior wall surface. Moreover it is most difficult under existing technology to seat the terminal electrical units (e.g. switching, power outlets, etc.) onto its wall box mounts so as to provide a face plate mounting which flushly nests against the exposed sections of the terminal electrical unit and the wall surface surrounding the wall mounted terminal electrical box assembly. This results in a tedious task of consistently repositioning the housing terminal electrical connectors (such as switches or power plug-in source connections) at the appropriate depth and placement so as to permit a flush face plate alignment with the covered receptacle as well as being in corresponding alignment with the cut-out portion and the surfacing face of the abutting wall. This perplexing problem can be effectively solved by providing a unique spacing member of a sufficient length, size and compressibility which when properly secured to an electrical box assembly allows a terminal electrical activating power source unit and a face plate to be placed in perfect alignment and interfacial contact with the abutting wall surface. This is achieved with nominal installation effort. The compressible spacing member allows the installer to monitor and control the mounting depth of the terminal electrical unit within the electrical box as well as its mounting interrelationship to the abutting wall surface so as to allow for a perfected flush face plate mounting thereto.

DETAILED DESCRIPTION

FIGS. 1-7 illustratively depict the embodiments of a wall mounted terminal electrical assembly 1 serving to provide an electrical activating power source unit 5 (e.g. electrical switch, power outlet, etc. often referred to herein as a "terminal electrical unit") equipped with the spacing member 9 features of this invention. The assembly 1 typically includes an electrical box 3 equipped for mounting in a recessed support cavity C. The depicted assemblies 1 include the conventional terminal electrical unit box mounts 3M for mounting the terminal electrical units 5 to the terminal box mounts 3M with terminal mounting screws 5S. The mountable terminal electric units 5 are conventionally equipped at each end with a mounting yoke 5L having screw receiving apertures 5A and 7M which respectively serve as screw mounts for the electrical units 5 and the covering face plate 7. Typically the assembly includes one or more terminal electrical units 5 with each unit 5 being customarily equipped with two wall box unit mounts 5A used to anchor each of the accommodated terminal units 5 with mounting screws 5S to their corresponding wall box mounts 3M.

With further reference to the Figures, terminal electrical box systems have been conventionally used for decades to mount terminal electrical units (generally referenced as 5) such as electrical switches 5T, power outlets 5P, etc. to a variety of recessed cut-out support sections WS such as to a floor, ceiling, standing wall support, etc. Such support mounted assemblies 1 often serve as a terminal electric outlet unit 5 for connecting operative electronic accessories thereto which illustratively may include electronic outlets 5P such as for appliances, power tools, audio, sensory, computers, lamps, etc. as well as the commonly used switching units 5T. These support mountable assemblies are typically comprised of three major components basically designed to structurally mount within a flat faced support cavity C (e.g. standing wall, ceiling, floor, etc.) and when properly installed will include a face plate 7 which rests flushly against the support surface WS and the terminal circuitry unit 5 containing the necessary terminal electronic unit 5 also resting snuggly beneath the face plate 7 in perfect parallel interfacing alignment with its abutting structural support surface WS. Most commonly these wall mounted switch or receptacle outlet assemblies 1 will consist of multiple terminal units 5 such as the multiple switching units 5T or outlets 5P or combinations thereof as depicted by FIGS. 1-5.

Figure 5:
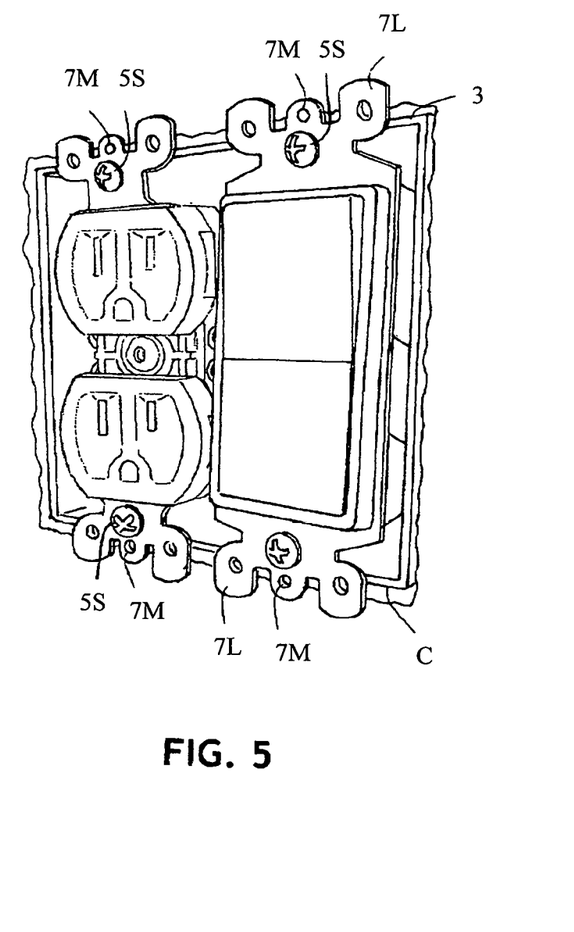
FIG. 5 is a corresponding view of FIG. 4 except that the terminal electrical units are comprised of a switching unit and an electrical power outlet.

Conventionally the face plates 7 characteristically possess an internally disposed concave perimeter which creates a margining circumscribing rim or flange 7R for encasing the unexposed or occluded sections of the activating electrical power unit 5 such as a switching unit 5T or terminal power outlet unit 5P as depicted by FIG. 5. The covering plates 7 conventionally include open sections 7B for accessing onto the operative exposed component (e.g. switches 5T, power outlets 5P, etc. of the terminal unit 5). It is essential in the final installation that the underside surfaces of the terminal electrical switching unit 5 interfacing onto underside surface of the face plate 7 match flushly with each other while the face plate outer perimeter flanged section 7R serves to flushly and evenly mate onto the exterior wall surface WS without any visible gaps therebetween.

The installation of a wall mounted electrical terminal box assembly 1 herein typically begins with the electrician creating a cut-out wall cavity section C which mates onto the insertion therewithin of terminal electrical circuitry box 3. The terminal electrical box 3 may then be customarily secured or anchored to the cut-out wall section WS. The next installation step involves installing what may be broadly referred to as installing the electrical terminal unit 5 (e.g. such as an electrical connecting circuitry or terminal power electrical activating unit) to box 3. The terminal electrical unit 5 and its installation involves anchoring each terminal unit 5 to its individual terminal unit mounts 3M. The final step involves securing the face plate 7 onto the appropriately mounted terminal electric unit 5 in such a manner so that the face plate 7 flushly mates onto the exterior wall surface WS without any visible wall gaps therebetween or gaps between the face plate 7 and the installed terminal electrical unit 5. If such gaps exist considerable time and effort is typically required to correct such imperfections. The embodiments of the present invention corrects these defects and does not adversely affect proper redundant grounding requirements.

The depicted assembly 1 departs from conventional receptacle or switching assemblies in that the assembly 1 herein is equipped with multiple compressive spacing units 9 wedged between the terminal unit mounting yoke 5L and their box mounts 3M. The compressive spacing units 9 allow the installer to pre-adjust the lateral positioning (e.g. in wall positioning) of the terminal unit 5 so as to permit a face plate 7 to nest flushly against an abutting wall surface WS with only nominal installation time and effort. The normally hidden sections of the terminal electrical unit 5 are likewise positionally mated harmoniously onto the covering face plate 7. The compressive spacing members 9 may be provided through the use of various different types of spacing members 9 which essentially compressively function in the same manner to effectively provide the same result. The compressive spacing members 9 adjustably position the terminal electrical unit 5 to each electrical box terminal unit mount 3M so as to allow the covering face plate 7 to flushly nest against support wall surface WS without any outwardly visible uneven separation between the covering face plate 7 and the protruding activating sections (e.g. 5T & 5P) of the terminal electrical unit 5 and the face plate opening sections 7B.

The wall mounted electrical terminal assembly 1 depicted by FIGS. 1-5 typically includes an electrical box 3 which internally mounts within the confines defined by the cut-out wall cavity C. This typically involves cutting an internal wall cavity C mating onto the insertion of the electrical box housing 3 therewithin. The electrical terminal box 3 typically houses the operable electronic circuitry of the terminating electrical unit or circuitry (generally prefixed by 5) such as an electrical switch 5T or a power outlet receptacle 5P and a covering face plate 7 having open sections 7B for the operationally exposed sections of the terminal unit 5 (e.g. exposed switching units 5T or power outlets 5P) while the remaining solid plate cover section 7C covers the hidden components of the assembly 1 such as the terminal switch box housing 3 and the unit mounting yoke 5L equipped with unit terminal set screw mounting orifices 5A for the set screw mounting of the terminal electrical unit 5 to box mounts 3M. The unit mounting yoke 5L of the electrical terminal unit 5 also typically includes face plate set screw mounts 7M (depicted as set screw receiving apertures) for securing the face plate 7 with face plate set screws 7S thereto. As previously mentioned, the electrical terminal box 3 includes an electrical terminal unit mount 3M (e.g. a threaded aperture or set screw aperture) for receiving terminal unit mounting set screws 5S which serves to mount the electrical circuitry terminal unit 5 to the electrical box 3.

In installing a mounted terminal electrical box assembly 1 having an electrical box member 3 housing at least one terminal electrical unit 5 (e.g. switch 5T, power outlet source 5P, etc.), the installed covering face plate 7 should evenly mate onto the exterior surface of the covered electrical terminal unit 5 as well as the external abutting wall surface WS (i.e. an abutting structural support surface) to which the electrical assembly 1 has been installed. If the electrical box assembly 1 installation deviates from its proper installation position, the improper positioning of the electrical connecting unit 5 readily misaligns the assembly 1 making it virtually impossible to flushly install the covering face plate 7 to the wall surface WS as well as to the terminal electronic unit 5. Costly additional time and effort by the installing electrician is too frequently incurred in order to correctly align and perfect an improperly wall mounted terminal electrical assembly 1. The electrical assembly 1 of the present invention includes a compressive spacing unit 9 adjustably positioned between its terminal unit box mounts 3M and the flanged terminal unit mounting yoke 5L which combination enables the electrician to readily install the wall mounted electrical assembly 1 in perfected alignment without necessitating any costly reworking to correct an improper wall mounting alignment.

As may be observed from FIGS. 1-5, the installation procedure of this invention deviates from current practices in that a compressible spacing member 9 is positioned between the terminal electrical unit mounting yoke 5L and the corresponding electrical unit box mounts 3M. Thus, when the electrical unit mounting screws 5S are tightened sufficiently to exert a compressive biasing force against the terminal unit 5, the installed compressive spacing members 9 allow for adjustable seating and positioning of the mounted terminal electric unit 5 within its wall mount. Thus by compressively wedging the compressive spacing member 9 between unit mounting yoke 5L and unit box mount 3M, a predetermined and perfect alignment for a flush placement of the face plate 7 upon its wall mount may be thereby effectively achieved.

Figure 1:
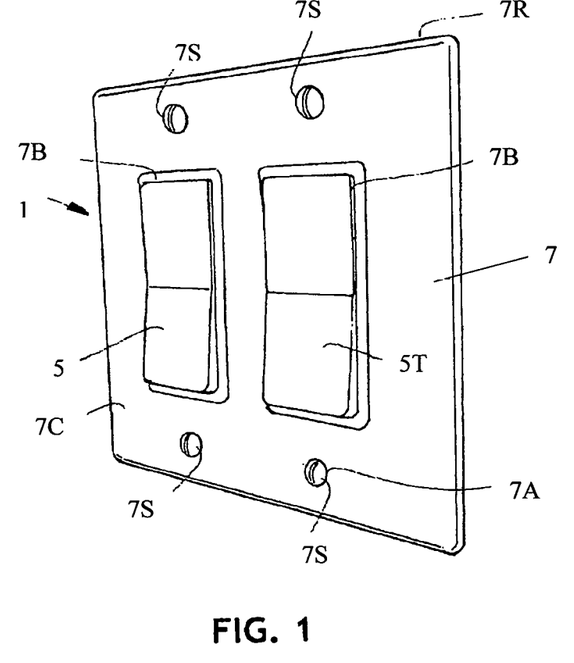
FIG. 1 is a frontal view depicting a terminal electrical unit assembly of this invention mounted to a cut-out section of wall with the assembly being equipped with spacing members (hidden from view) which place the hidden terminal electrical units in proper alignment with the abutting wall surface and a covering face plate.
Figure 2:
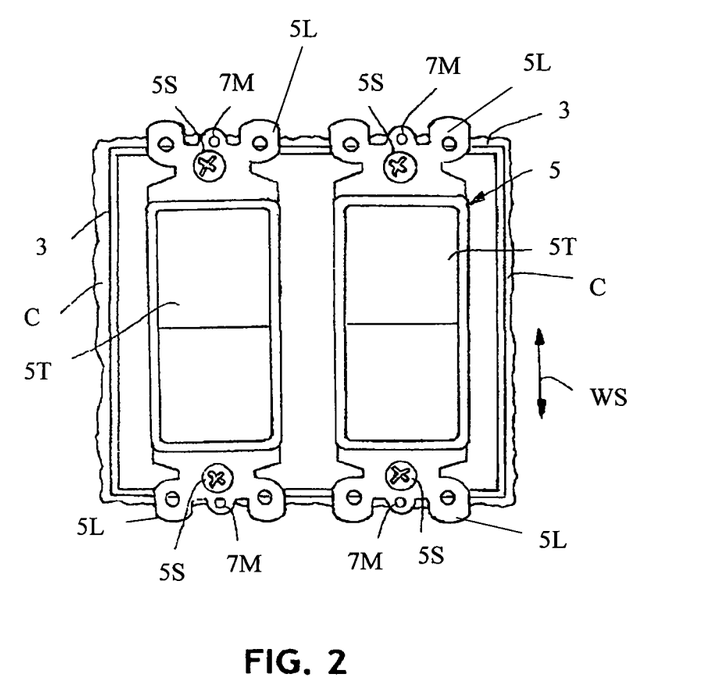
FIG. 2 is a frontal view of the assembly shown in FIG. 1 with the covering face plate shown in FIG. 1 being removed from the assembly.
Figure 3:
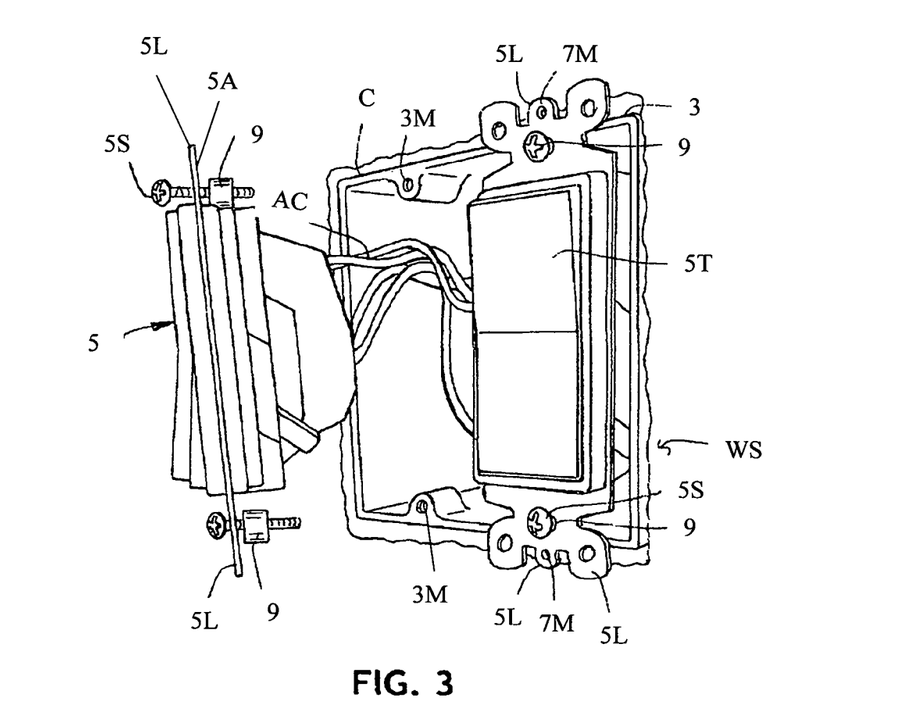
FIG. 3 depicts a partially installed terminal electrical assembly of this invention depicting one of the terminal units of FIG. 1 being compressively mounted between its switch box mount and a terminal unit mounting yoke of one terminal unit and another unmounted switching unit showing the placement of uncompressed spacing members before being compressively mounted between the unit mounting yoke mounts and the corresponding box mounts.
Figure 4:
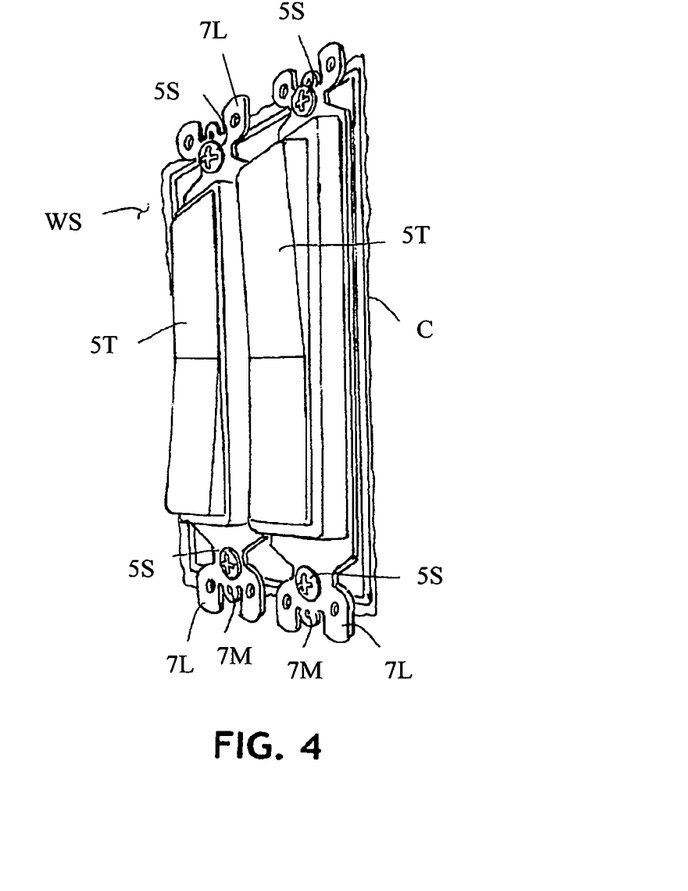
FIG. 4 is a side elevational view of the unmounted switching unit shown in FIG. 3 mounted to the electrical wall box with the spacing members being sufficiently compressed between the electrical terminal unit mounts and the electrical box mounts to permit a covering face plate to be flushly mounted onto the terminal unit and the abutting wall surface as shown in FIG. 1.

As may be further observed particularly by the depiction of FIG. 3, the spacing member 9 is sized to compressively wedge between the unit mounting yoke 5L of unit 5 and box screw mount 3M when the unit screws 5S are appropriately drawn onto the unit box mounts 3M. The length of the compressible spacing member 9 should be sufficient so as to allow the electrical terminal unit 5 and the face plate terminal electrical unit mount 7M to be adjustably tightened and positionally aligned so as to allow for a flush and even placement of the face plate 7 against the abutting wall surface WS.

Figure 6:
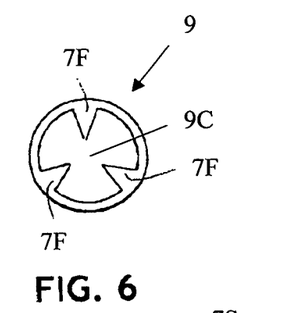
FIG. 6 is a top view of a spacing member depicted in FIG. 3.
Figure 7:
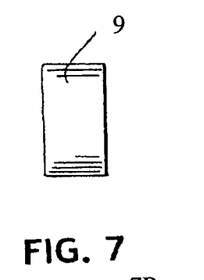
FIG. 7 is a longitudinal view of the spacing member depicted in FIG. 6.

With further reference to FIGS. 3 and 6-7, the compressive spacing member 9 may be provided in a pliable tubular or other suitable resilient spacing form having sufficient pliability and rebounding properties to allow the terminal unit mounting screws 5S to adjustably apply sufficient compression against the compressive spacing member 9 to preset the electrical terminal unit 5 at a desired aligned position which allows the terminal unit 5 and the face plate 7 to matingly and flushly nestle onto terminal unit 5 and the supporting wall surface WS. By appropriately equipping the compressive spacing member 9 with an internally disposed screw aligning open core 9C as depicted by FIG. 6, an effective placement of terminal mounting set screws 5S at an appropriate vertical alignment with the terminal unit box mounts 3M may be achieved. The aligning core 9C also contributes to provide the desired degree of compressibility to common flexible thermoplastic materials in a tubular form such a polyethylene, polypropylene, PVC, etc. tubing materials. This particular arrangement places each electrical terminal unit anchoring screw 5S in perfect vertical alignment with the terminal unit mounts 3M of the electrical box 3 while also providing the appropriate spacial alignment for correctly aligning and installing the covering face plate 7 flushly against the outer wall surface WS. This system uniquely allows the electrician to more expeditiously install wall mounted electrical outlet box assembly 1 while also insuring that each installation will be professionally and expeditiously installed evenly and flushly upon the wall surface WS.

An uncut resilient and flexible tubular stock material provides a suitable source material for the compressive spacing member 9. The preparation of the compressible spacing member 9 may entail cutting the member 9 at the installation site from a compressive flexible plastic tubing stock to an appropriate spacing length for the installation and thereby provide the needed comprehensive spacing for placing the terminal electrical unit 5 in correct alignment so as to permit the nesting thereof flushly onto the covering face plate 7 while also allowing the face plate 7 to nest flushly against the wall surfaces WS as illustrated by FIG. 1-5. In the installation, the spacing member 9 may be suitably inserted and threaded onto the terminal unit mounting screw 5S which is initially inserted onto terminal mounting site 3M carried by terminal unit mounting yoke 5L. As illustrated by the unmounted terminal unit 3 depicted by FIG. 3, each threaded set screws 5S may then be correspondingly threaded onto its corresponding box mount 3M so as to apply sufficient compression depth to the compressible spacing member 9 to provide the desired interfacing fitting. Thereafter, the face plate screws 7S are used to fasten the face plate 7 via the apertured terminal unit face plate mounts 7A to its corresponding face screw mounts 7M (e.g. threadable or threaded) carried by the unit mounting yoke 5L of the terminal electrical unit 5 to complete the installation.

The particular characteristic including the compression characteristics of the tubular spacing member 9 affects its efficacy. The compression characteristics of member 9 will be sufficient to exert a rebounding force against unit mounting yoke 5L leaving a sufficient degree of compressibility to permit additional decompression when the face plate 7 is subsequently mounted to face mount 7M carried by unit mounting yoke 5L. A spacing member 9 of excessive compressibility such as commonly used in a foamed rubber mattress will characteristically fail to provide sufficient compressive resistance to provide sufficient rebound pressure so as to permit an appropriate alignment of the installed face plate 7. Similarly a too rigid thermoplastic material such as rigid PVC plumbing pipes will lack the necessary flexibility and compressive characteristics to effectively function as a spacing member 9. Conversely, flexible thermoplastic spacing members 9 such as the compressible polyolefins (i.e. high density polyethylene, polypropylenes, etc.) the compressible polyvinyl halides (e.g. PVC) and the like are particularly effective for use as a compressive spacing member 9. The electrician observing the appropriate spacing needed to compressively provide the desired snug fit may accordingly cut from a compressive plastic tubular stock material the desired compressive spacing needed for the proper assemblage. To provide sufficient spacing adjustment to the assembly 1, the spacing member 9 will typically have a substantially greater length than width and most suitably will be provided in an elongated tubular form. Typically a suitable compressible thermoplastic or rubber spacing member 9 will have a length ranging from about 2 mm to about 10 mm and most suitably from about 3 mm to about 8 mm in length. Such compressible spacing members 9 have been found to provide an effective placement and alignment of the electrical terminal units 5 with the electrical box 3 by creating the appropriate compression between the terminal electric unit mounting yokes 5L and electrical box terminal unit mount 3M. The width or circumference of the mounting member 9 will necessarily be sized to wedge between the unit mounting yokes 5L and the terminal unit box mounts 3M to thereby allow for compression therebetween so as to permit a flush placement of the face plate 7 thereupon. Alternatively the compressive spacing members 9 may be cut in predetermined lengths having the desired compressive characteristics at the manufacturing site suitable for installation by the electrician.

The efficacy of the spacing member 9 becomes especially adaptable to the invention if the spacing member 9 is constructed of a pliable material which compresses while also possessing rebound characteristics sufficient to apply a counteracting compressive biasing force between the terminal box 3 and the terminal electric unit 5 so as to allow the covering face plate 7 to rest flushly to the wall surface WS as well as the terminal unit 5. The stiffer, but compressible spacing members 9 which possess sufficient rebound characteristics to resist compressive forces while also applying an outwardly counteracting biasing force upon compression against the electrical terminal unit 5 may be used for this purpose. Many plastics including the commonly available thermoplastics (e.g. polyethylene, polypropylene, vinyl chlorides, etc.) and the elastomeric thermosets (e.g. polyurethane, synthetic rubbers, etc.) and natural rubbers of the appropriate compressibility may be effectively used as a spacing member 9.

It is also further desirable to provide the compressive spacing member 9 in a form which centers the anchoring screws 5S onto the terminal unit box set screw anchoring apertures mounts 3M of box 3. The set screws 5S are most appropriately positioned for an aligned screwing onto the terminal unit mounts 3M so as to flushly mate the accessing power unit 5 (e.g. switching or terminal connecting outlet units) and the face plate 7 to the wall surface WS. With particular reference to the top view of FIG. 6, the tubular spacing member 9 may be appropriately fitted with a set screw centering core 9C created by inwardly arcuate guiding flaps 7F. The set screw centering core 9C may also be utilized to retain the set screws 5S and the compressive spacing member 9 as an integral unit for seating and compression onto unit mount 3M. The centering guide 9C accordingly facilitates the time and ease for anchoring the terminal unit mounting set screws 5S to the anchoring terminal unit mount 3M. Other centering guides 9C such as thicker walled elastomeric materials sized to receive and retain the anchoring set screws 5S may also be used for this purpose. The set screw centering core 9C will most appropriately provide a sufficient clearance between the centering guide flaps 7F so that the set screws 5S may then be appropriately adjusted to properly mate onto the set screw unit mount 3M of box 3 for anchoring the terminal unit mount 3M thereto. The core 9C also contributes to providing a base material which contributes compressibility to materials which would normally be of a too rigid structure when provided in a more solid form. Similarly annular coiled plastic and metal biasing members such as metal springs diametrically and compressively sized to receive set screw 5S and provide the appropriate biasing and spacial relationship between the box and unit mounts may also be used for this purpose. Conventional plastic molding and extrusion techniques may be used to manufacture the FIG. 6-7 spacing member 9. Other means for centering the set screws 5S upon the anchoring unit mounting yoke 5L such as capping the tubular spacing member 9 with a cap having a centering guide (not shown) on each end of the spacing member 9 may also be used for this purpose.

The terms "wall mounted terminal electrical box assembly" and "a support mounted terminal electrical assembly" broadly apply to a terminal electrical circuitry box mounted to any support having a recessed cavity C for its mounting. Such assemblies 1 include the covering face plate 7, an electrical terminal circuitry unit 5 (typically a switch or an electrical connection site) and a recessed (e.g. wall cavity) mounted box insert. The terms "electrical power activating box" or "electrical power activating unit" have general reference to the basic function performed by such boxes or unit 5 of activating or regulating electrical power inputs and outlets typically illustrated by switches 5T or power outlets 5P. The wall mounted electrical box assembly is typically connected to a power source such as a conventional AC source or other suitable electrical power source. Besides electrical switches 5T and electrical power outlets 5P, other exemplary terminal electrical circuitry assemblies and systems include wall mounted data box connectors, telephone jacks, coaxial cable and TV connectors, internet connection junctures and the like all of which similarly include a mounting box 3, a terminal electrical unit 5 for applying electrical power and a covering face plate 7.

As illustrated by the Figures, the present invention provides sufficient leeway to correct the inherent installation deficiencies of prior practices. This allows the installers to provide a perfected installation notwithstanding hidden defects which would normally lead to a faulty terminal electrical box assembly mount.

What is claimed is:

1. A support mounted electrical power activating box assembly comprising a terminal electrical box equipped with terminal unit box mounts mounted to a cavity within a walled support section, multiple longitudinally continuously solid compressed spacing members which individually correspond to one of the terminal unit box mounts, at least one electrical power activating unit having outwardly exposed electrical operative sections for effectuating a flow of an electrical current therethrough with said unit having unit mounting yokes fitted with unit set screw receiving apertures correspondingly mating onto one of the terminal unit box mounts, multiple unit set screws threaded sufficiently onto each of the terminal unit mounts to compressively wedge one of the spacing members between each of the unit mounting yokes and the corresponding unit box mounts under sufficient compression so as to place each of the unit mounting yokes at a desired alignment onto an abutting support surface area and a covering face plate secured to the unit mounting yokes and interfacially nesting flushly against the abutting surface area.

2. The assembly according to claim 1 wherein the support mounted assembly comprises a sidewall installed assembly and the spacing member comprises a resilient spacing member of a sufficient length and diameter to receive the unit set screws and resiliently compress to a desired compressed position so as to align the unit mounting yokes with abutting surface area when compressed between the unit mounting yokes and the box mounts.

3. The assembly according to claim 2 wherein the spacing member comprises a thermoplastic cylinder having a hollow core section for seating the set screws therewithin.

4. The assembly according to claim 3 wherein each of the spacing members measures from about 3 mm to about 10 mm in length.

5. The assembly according to claim 4 wherein the spacing members comprise a compressible thermoplastic cylinder possessing elastic rebounding properties.

6. The assembly according to claim 4 wherein the spacing member comprises a flexible polyvinyl chloride spacing member of a length and diameter sufficient to compressively seat the unit at a desired positioning for the mounting of the face plate thereto.

7. A method for flushly mounting a mounted electrical box assembly to a cut-out support section, said method comprising:

a. providing a support mountable power activating box assembly comprising:
  i. an electrical power activating unit which regulates electrical current inputs and outputs of the unit with said unit including a unit mounting yoke having oppositely positioned unit mounting apertures adapted to receive registering unit mounting set screws and to receive face plate mounting screws,
  ii. an insertable terminal electrical box sized for insertion within the cut-out support section and sized to house at least one power activating unit with said box being equipped with multiple set screw unit mounts each of which bears a corresponding registration to a mating aperture to the unit apertures carried by the unit mounting yoke sections for securing the power activating unit to the unit mounts with unit mounting set screws,
  iii. at least two longitudinally continuously solid compressible spacing members sized for placement between the unit mounting yoke sections and the unit mounts with said spacing members providing sufficient compression and rebounding characteristics to permit the unit mounting yoke sections to be placed in planar alignment to a support surface circumscribing the cut-out support section, and
  iv. a face place equipped with face plate mounting apertures and face plate mounting set screws for securing the face plate to face plate set screw receiving apertures carried by the unit mounting yoke sections;
b. installing the box onto the cut-out support section;
c. positionally inserting individually each of the spacing members between each of the set screw unit mounts and the mating apertures of the unit mounting yoke sections with a registering aligning unit set screw being threaded onto corresponding set screw mounts;
d. wedging each of the spacing members against each of the box unit mounts by drawing each of the unit mounting yoke sections onto each of the box unit mounts so as to place the unit mounting yoke sections at a desired positional alignment with the support surface, and;
e. securing the face plate to the face plate set screw receiving apertures carried by the unit mounting yoke with the face plate mounting set screws by drawing the face plate flushly against a wall surface margining onto the cut-out section for said electrical box assembly.

8. The method according to claim 7 wherein the spacing members comprise a thermoplastic cylinder having a hollow center core for seating the unit set screws therewithin and the unit set screws are tightened sufficiently to allow for a flush placement of the face plate against the wall surface while providing interfacial correspondence with the terminal unit covered thereby.

9. The method according to claim 7 wherein the box comprises a sidewall mountable box and the installing includes installing the box within a cut-out section of a sidewall cavity.

10. The method according to claim 9 wherein the spacing member comprises a compressible thermoplastic spacing member.

11. The method according to claim 10 wherein the spacing member is a tubular spacing member measuring about 3 to about 8 mm in length.

* * * * *